United States Patent
Yang et al.

(10) Patent No.: US 9,704,011 B2
(45) Date of Patent: Jul. 11, 2017

(54) ARRAY SUBSTRATE, DRIVING METHOD THEREOF, AND DISPLAY APPARATUS

(71) Applicants: BOE Technology Group Co., Ltd., Beijing (CN); Beijing BOE Optoelectronics Technology Co., Ltd., Beijing (CN)

(72) Inventors: Shengji Yang, Beijing (CN); Xue Dong, Beijing (CN); Haisheng Wang, Beijing (CN); Yingming Liu, Beijing (CN); Hongjuan Liu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 313 days.

(21) Appl. No.: 14/549,814

(22) Filed: Nov. 21, 2014

(65) Prior Publication Data

US 2016/0042216 A1 Feb. 11, 2016

(30) Foreign Application Priority Data

Aug. 7, 2014 (CN) .......................... 2014 1 0386744

(51) Int. Cl.
*G06K 9/00* (2006.01)
*G06F 3/041* (2006.01)
(Continued)

(52) U.S. Cl.
CPC .......... *G06K 9/0002* (2013.01); *G06F 3/042* (2013.01); *G06F 3/044* (2013.01); *G06F 3/0412* (2013.01);
(Continued)

(58) Field of Classification Search
None
See application file for complete search history.

(56) References Cited

U.S. PATENT DOCUMENTS 8,618,865 B1 * 12/2013 Lu ........................... G06F 3/044
327/517
2002/0126215 A1 * 9/2002 Shigematsu ........... H04N 5/355
348/302
(Continued)

FOREIGN PATENT DOCUMENTS

CN 1283833 A 2/2001
CN 1564189 A 1/2005
(Continued)

OTHER PUBLICATIONS

Jul. 5, 2016—(CN)—First Office Action Appn 201410386744.1 with English Tran.

*Primary Examiner* — Wesley Tucker
(74) *Attorney, Agent, or Firm* — Banner & Witcoff, Ltd.

(57) ABSTRACT

Embodiments of the present disclosure disclose an array substrate, a driving method thereof, and a display apparatus. A fingerprint recognition module can be arranged within a display region, so as to achieve a purpose of simplifying operations and manufacturing processes. The present disclosure provides an array substrate, the array substrate comprises a base on which gate lines and data lines as well as pixel units defined by the gate lines and the data lines are formed, and the plurality of fingerprint recognition circuits for performing fingerprint recognition are further formed on the base, the fingerprint recognition circuits are arranged within the pixel unit.

16 Claims, 8 Drawing Sheets

(51) Int. Cl.
*G06F 3/044* (2006.01)
*G06F 3/042* (2006.01)
*G09G 3/36* (2006.01)

(52) U.S. Cl.
CPC ......... *G06K 9/0004* (2013.01); *G09G 3/3648* (2013.01); *G06F 2203/04103* (2013.01)

(56) References Cited

U.S. PATENT DOCUMENTS

| | | | | |
|---|---|---|---|---|
| 2004/0252867 | A1* | 12/2004 | Lan | G06K 9/0004 382/124 |
| 2007/0024546 | A1* | 2/2007 | Jang | G06K 9/0002 345/78 |
| 2009/0206849 | A1* | 8/2009 | Chuang | G06K 9/0002 324/686 |
| 2012/0313913 | A1* | 12/2012 | Shiraki | G06F 3/0412 345/207 |
| 2016/0048717 | A1* | 2/2016 | Yang | G06K 9/00087 382/124 |

FOREIGN PATENT DOCUMENTS

| | | |
|---|---|---|
| CN | 101359369 A | 2/2009 |
| CN | 101452527 A | 6/2009 |
| EP | 2184700 A2 | 5/2010 |

\* cited by examiner

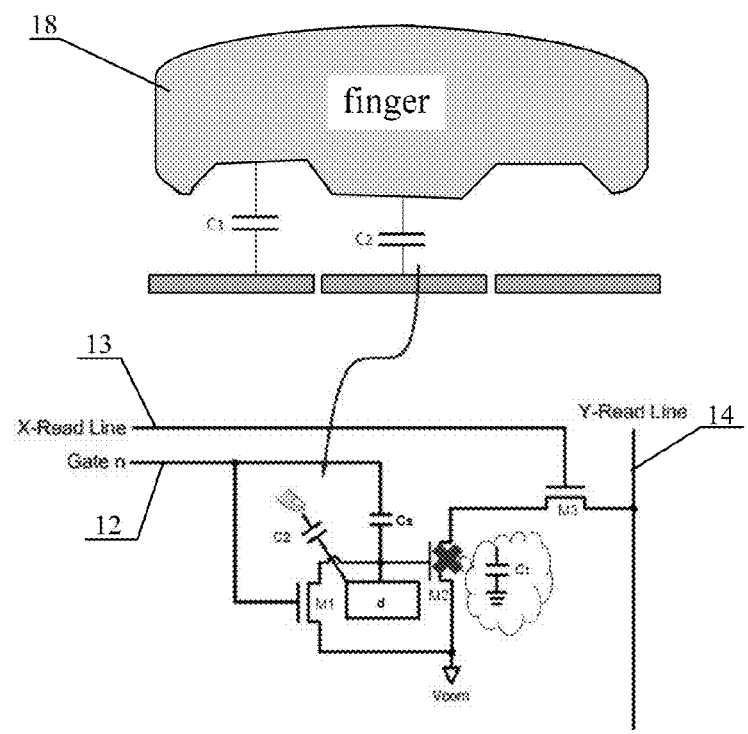

Fig. 4

| the initialization unit in the fingerprint recognition circuit initializes the fingerprint recognition unit under the control of the initialization signal line, while the first output control unit turns off the output path under the control of the output control signal line | 101 |

| the initialization unit is turned off under the control of the initialization signal line, meanwhile the recognition signal generated by the fingerprint recognition unit is outputted to the signal read line under the control of the output control signal line | 102 |

Fig. 5

ARRAY SUBSTRATE, DRIVING METHOD THEREOF, AND DISPLAY APPARATUS

This application claims priority to Chinese Patent Application No. 201410386744.1, filed on Aug. 7, 2014. The present application claims priority to and the benefit of the above-identified application and is incorporated herein in its entirety.

TECHNICAL FIELD

The present disclosure relates to a displaying field, and in particular relates to an array substrate, a driving method thereof and a display apparatus.

BACKGROUND

Recently, as portable medias such as a mobile phone and a tablet are becoming more popular, consumers' requirements for a security in the personal data grow increasingly, meanwhile, a convenience of operations and a diversity of applications are also focuses which designers need to take into account.

Also, in a personal authentication system based on the security, a method for performing a fingerprint recognition by using a fingerprint recognition device is used widely, because the method of fingerprint recognition can be implemented at a low cost and has features of a great usability and a high accuracy. Currently, the fingerprint recognition device is mainly based on a silicon capacitance effect of the semiconductor (which uses a silicon sensor to identify the fingerprint information), that is, a detecting electrode of a silicon sensor functions as one plate of the capacitor, a finger acts as the other plate of the capacitor, and there are differences among coupling capacitances formed between concave-convex textures of finger's patterns and the detecting electrode which is relatively smooth, the difference information regarding the coupling capacitances is collected by a terminal to determine the concave-convex information of the finger to get the fingerprint data of the finger. As compared with other fingerprint recognition technologies, the fingerprint sensor based on the silicon capacitance effect of the semiconductor has advantages of good image quality, no distortion at most of the time, small size, thereby the system security is increased greatly.

Currently, it is common that a fingerprint recognition module is arranged in the remainder with respect to a display region in the portable media, thereby implementing the fingerprint recognition function; when being used by the user, other operations can generally be performed only when the fingerprint recognition is performed in advance and this is not convenient, and the display device and the fingerprint recognition device are needed to be combined in function as they are manufactured, so this is relatively burdensome.

SUMMARY

The present disclosure provides an array substrate, a driving method thereof and a display apparatus, wherein a fingerprint recognition module may be arranged within a display region, which achieves a purpose of simplifying the operations and the manufacturing processes.

The following technical solutions are utilized by the embodiments of the present disclosure to achieve above-described purposes.

In one aspect, an embodiment of the present disclosure provides an array substrate, the array substrate comprises a base on which gate lines and data lines as well as pixel units defined by the gate lines and the data lines are formed, a plurality of fingerprint recognition circuits for performing a fingerprint recognition are further formed on the base, the fingerprint recognition circuit is arranged within the pixel unit.

In an example, a signal read line, an initialization signal line, a common voltage input terminal, an output control signal line are further formed on the base; the fingerprint recognition circuit comprises an initialization unit, a fingerprint recognition unit and a first output control unit, wherein, the initialization unit is connected with the fingerprint recognition unit and is connected to the common voltage input terminal, which is used for initializing the fingerprint recognition unit under a control of the initialization signal line; the fingerprint recognition unit is connected with the common voltage input terminal and the initialization signal line, which is used for recognizing the fingerprint in a corresponding area and generating a recognition signal; the first output control unit is connected with the fingerprint recognition unit and is connected to the output control signal line and the signal read line, which is used for outputting the recognition signal generated by the fingerprint recognition unit to the signal read line under the control of the output control signal line.

In an example, the initialization unit specifically comprises a first transistor, a first terminal of the first transistor is connected to the common voltage input terminal, a second terminal thereof is connected to a voltage input terminal of the fingerprint recognition unit, and a control terminal thereof is connected to the initialization signal line.

In an example, the fingerprint recognition unit comprise a reference capacitor, a sensing electrode and a second transistor; wherein, a first terminal of the reference capacitor is connected with the sensing electrode and is connected with the second terminal of the first transistor, as the voltage input terminal of the fingerprint recognition unit, a second terminal of the reference capacitor is connected to the initialization signal line; a control terminal of the second transistor is connected with the first terminal of the reference capacitor, a first terminal of the second transistor is connected to the common voltage input terminal, and a second terminal thereof is connected to the first output control unit, as an output terminal of the fingerprint recognition unit.

In an example, the first output control unit comprises a third transistor, a first terminal of the third transistor is connected to the output terminal of the fingerprint recognition unit, a second terminal thereof is connected to the signal read line, and a control terminal thereof is connected to the output control signal line.

Further, a plurality of light sensation touching circuits for implementing the light sensation touching function are further formed on the base, the light sensation touching circuits is also arranged within the pixel unit.

In an example, the light sensation touching circuit comprise: a photosensitive unit, connected with the common voltage input terminal, for collecting an optical signal in the corresponding area and converting the same into a photocurrent signals; a second output control unit, connected with the output terminal of the photosensitive unit and connected to the initialization signal line and the signal read line, for outputting the photocurrent signal generated by the photosensitive unit to the signal read line under the control of the initialization signal line.

In an example, the photosensitive unit comprises a photosensitive tube and a storage capacitor for storing the photocurrent generated by the photosensitive tube, wherein, a first terminal of the photosensitive tube is connected with a control terminal of the photosensitive tube and a first terminal of the storage capacitor, and is connected to the common voltage input terminal, a second terminal of the photosensitive tube is connected with a second terminal of the storage capacitor and is connected with the second output control unit, as an output terminal of the photosensitive unit.

In an example, the second output control unit comprises a fourth thin film transistor, a first terminal of the fourth transistor is connected to the output terminal of the photosensitive unit, a second terminal thereof is connected to the signal read line, and a control terminal thereof is connected to the initialization signal line.

Optionally, the initialization signal line is arranged to be parallel with the gate line, and the signal read line is arranged to be parallel with the data line.

In an example, the initialization signal line is acted by the gate line, and the output control signal line is acted by a gate line next to the initialization signal line.

An embodiment of the present disclosure further provides a display apparatus comprising the array substrate in any one of above items.

In an example, an amplifier is further connected to the fingerprint recognition circuit; a first input terminal of the amplifier is connected to the end of the signal read line in the fingerprint recognition circuit, a second input terminal of the amplifier is inputted with a reference voltage, and a capacitor and a switch are connected in parallel between the first input terminal and the output terminal of the amplifier.

In another aspect, an embodiment of the present disclosure provides a driving method of an array substrate, comprising:

an initialization stage: an initialization unit in a fingerprint recognition circuit initializes a fingerprint recognition unit under a control of an initialization signal line, while a first output control unit turns off an output path under a control of an output control signal line;

a collection stage: the initialization unit is turned off under the control of the initialization signal line, meanwhile a recognition signal generated by the fingerprint recognition unit is outputted to the signal read line under the control of the output control signal line.

An embodiment of the present disclosure further provides another driving method of an array substrate, comprising:

a first stage: as for a fingerprint recognition circuit, an initialization unit initializes the fingerprint recognition unit under a control of the initialization signal line, while a first output control unit turns off an output path under a control of an output control signal line; as for a light sensation touching circuit, a second output control unit turns on the output path from a photosensitive unit to a signal read line under the control of the initialization signal line, a photocurrent signal generated by the photosensitive unit due to an illuminating by the light is outputted via the signal read line, an outputted difference value of intensity changes in the photocurrent signal is compared with a no-touching threshold value, and then it is decided that whether a light touching action occurs in the first stage and a position of the light touching action based on the comparison result;

a second stage: as for the fingerprint recognition circuit, the initialization unit is turned off, meanwhile a recognition signal generated by the fingerprint recognition unit is outputted to the signal read line under the control of the output control signal line; as for the light sensation touching circuit, the second output control unit turns off the output path from the photosensitive unit to the signal read line.

The embodiments of the present disclosure provide the array substrate, the driving method thereof and the display apparatus, wherein the fingerprint recognition circuits are arranged within the pixel of the display region, and when being used by the user, the fingerprint recognition and the operations can be performed synchronously, and the display device and the fingerprint recognition devices can be manufactured synchronously without being combined in function, which can achieve the purpose of simplifying the operations and the manufacturing processes.

BRIEF DESCRIPTION OF THE DRAWINGS

In order to explain solutions in embodiments of the present disclosure or the prior art more clearly, drawings required as describing the embodiments of the present disclosure or the prior art will be introduced briefly below. Obviously, the drawings described below only some embodiments of the present disclosure, but those ordinary skilled in the art may obtain other drawings according to these drawings without any inventive labors.

FIG. 4 is an exemplary view illustrating the operating principle of the fingerprint recognition circuit when the fingerprint above the detecting electrode is a convex part in the first embodiment of the present disclosure;

FIG. 5 is a flowchart of a driving method of the array substrate according to the first embodiment of the present disclosure;

REFERENCE SIGNS

11—Data line, 12—Gate line, 13—Output control signal line, 14—Signal read line, 15—Pixel unit,
16—Fingerprint recognition circuit, 161—Initialization unit, 162—Fingerprint recognition unit,
163—First output control unit, 17—light sensation touching circuit, 171—Photosensitive unit,
172—Second output control unit, 18—Finger, 19—Pixel displaying circuit, 20—Amplifier,
d—Detecting electrode, Cs—Reference capacitor, M1—First transistor, M3—Third transistor,
M2—Second transistor, T1—Photosensitive tube, T2—Fourth transistor, $C_p$—Storage capacitor, TFT—switching tube, $C_{st}$—Liquid crystal deflection capacitor, $C_{1c}$—Displaying storage capacitor, C—Capacitor, K—Switch.

DETAILED DESCRIPTION

Thereafter, solutions of embodiments of the present disclosure will be described clearly and completely in connection with drawings of the embodiments of the present disclosure, but obviously the described embodiments are only some, but not all of the embodiments of the present disclosure.

An embodiment of the present disclosure provides an array substrate, the array substrate comprises a base on which gate lines and data lines as well as pixel units defined by the gate lines and the data lines are formed, a plurality of fingerprint recognition circuits for performing a fingerprint recognition are further formed on the base, the fingerprint recognition circuit is arranged within the pixel unit.

In the array substrate according to the embodiment of the present disclosure, the fingerprint recognition circuit is arranged within the pixel of the display region, when being used by the user, the fingerprint recognition and the operations can be performed synchronously, and the display device and the fingerprint recognition devices can be manufactured synchronously without being combined in function, which can achieve the purpose of simplifying the operations and the manufacturing processes. With a display panel using such an array substrate, the displaying function and the fingerprint recognition function can be implemented simultaneously.

Further, in the array substrate according to the embodiment of the present disclosure, a plurality of light sensation touching circuits for implementing the light sensation touching function are further formed on the base, the light sensation touching circuit is also arranged within the pixel unit.

In the array substrate according to the embodiment of the present disclosure, both of the fingerprint recognition circuits and the light sensation touching circuits may be arranged within the display region of pixel; with a display panel using such an array substrate, three functions of displaying, fingerprint recognition and light touching (optical remote sensing) can be implemented simultaneously. This will be explained in detail by means of specific embodiments below.

First Embodiment

Figure 1:
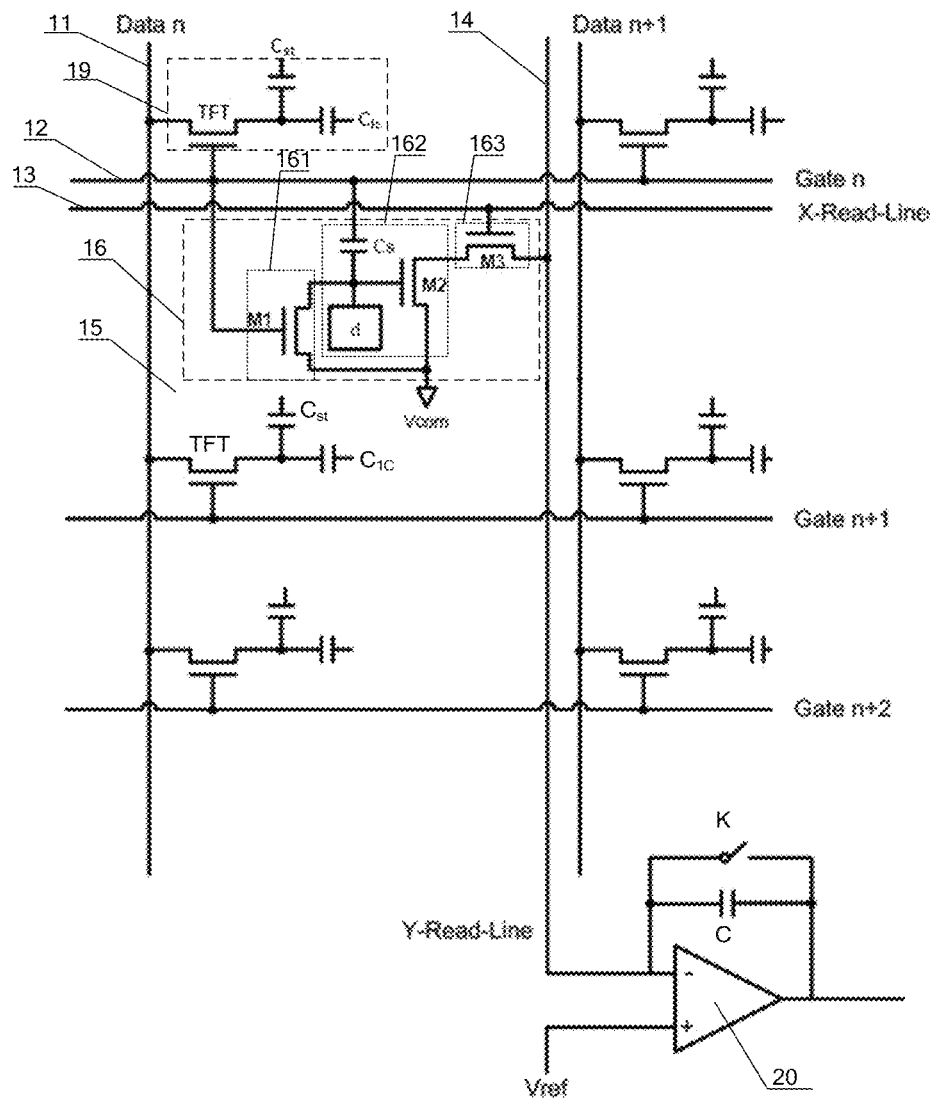
FIG. 1 is an exemplary view illustrating a first structure of an array substrate according to a first embodiment of the present disclosure.

An embodiment of the present disclosure provides an array substrate, as shown in FIG. 1, the array substrate comprises a base on which a data line 11 and a gate line 12 as well as a pixel unit 15 defined by the data line 11 and the gate line 12 are formed, a plurality of fingerprint recognition circuits 16 for performing fingerprint recognition are further formed on the base, the fingerprint recognition circuit 16 is arranged within the pixel unit 15.

The present embodiment provides a design scheme for the array substrate in which the fingerprint recognition circuit 16 is arranged within the pixel unit 15 of the display region, that is, besides the pixel displaying circuit 19, the fingerprint recognition circuits 16 is also arranged in the pixel unit 15, and when being used by the user, the fingerprint recognition and other operations can be performed synchronously. And, the display device and the fingerprint recognition devices can be manufactured synchronously without being combined in function, which achieves the purpose of simplifying the operations and the manufacturing processes. With a display panel using such an array substrate, the displaying function and the fingerprint recognition function can be implemented simultaneously.

As for a liquid crystal display, the pixel displaying circuit 19 as described above comprises a switching tube TFT for controlling a loading of displaying signals, a liquid crystal deflection capacitor $C_{st}$ and a displaying storage capacitor $C_{1c}$.

In an example, the built-in fingerprint recognition circuits 16 and the pixel displaying circuit 19 as described above are combined with each other by a signal multiplexing manner, thereby a combination of the displaying function and the fingerprint recognition function is realized.

The embodiments of the present disclosure have no limitations on the implementations of the fingerprint recognition circuits 16, which may be any implementations well-known to those skilled in the art, and only one optional implementation of the fingerprint recognition circuits 16 is explained below as a reference.

As shown in FIG. 1, a signal read line 14 (i.e., a Y-Read Line in the figure), an initialization signal line (a gate line Gate n functions as it), a common voltage input terminal Vcom, an output control signal line 13 (i.e., a X-Read Line in the figure) are further formed on the base. The fingerprint recognition circuits 16 comprises an initialization unit 161, a fingerprint recognition unit 162 and a first output control unit 163. Wherein, the initialization unit 161 is connected with the fingerprint recognition unit 162 and is connected to the common voltage input terminal Vcom, and is used for initializing the fingerprint recognition unit 162 under the control of the initialization signal line (gate line Gate n); the fingerprint recognition unit 162 is connected with the common voltage input terminal Vcom, the initialization signal line (the gate line Gate n), and is used for recognizing the fingerprints in corresponding areas and generating a recognition signal; the first output control unit 163 is connected with the fingerprint recognition unit 162 and is connected to the output control signal line 13 and the signal read line 14, and is used for outputting the recognition signal generated by the fingerprint recognition unit 162 to the signal read line 14 under the control of the output control signal line 13.

It should be noted that, the present embodiment has no limitations on the specific implementations of the initialization unit 161, the fingerprint recognition unit 162 and the first output control unit 163 in the fingerprint recognition circuits 16, as long as they have the corresponding functions, and those skilled in the art can implement by selecting corresponding electrical devices flexibly, and the circuit connection can be designed differently based on the different electrical devices, and only one optional specific implementation will be explained in the following as a reference.

In an example, the initialization unit 161 specifically comprises a first transistor M1, a first terminal of the first transistor M1 is connected to the common voltage input terminal Vcom, a second terminal thereof is connected to a voltage input terminal of the fingerprint recognition unit 162, and a control terminal thereof is connected to the initialization signal line (the gate line Gate n).

In an example, the fingerprint recognition unit 162 specifically comprises a reference capacitor Cs, a sensing electrode d and a second transistor M2. A first terminal of the reference capacitor Cs is connected with the sensing electrode d and is connected with the second terminal of the first transistor M1, as a voltage input terminal of the fingerprint recognition unit 162, a second terminal of the reference capacitor Cs is connected to the initialization signal line (the gate line Gate n); a control terminal of the second transistor M2 is connected with the first terminal of the reference capacitor Cs, a first terminal of the second transistor M2 is connected to the common voltage input terminal Vcom, and a second terminal thereof is connected to the first output control unit 163, as the output terminal of the fingerprint recognition unit 162.

In an example, the first output control unit 163 specifically comprises a third transistor M3, a first terminal of the third transistor M3 is connected to the output terminal of the fingerprint recognition unit 162, a second terminal thereof is connected to the signal read line 14, and a control terminal thereof is connected to the output control signal line 13.

FIG. 1 only illustrates a structure of one pixel unit on the array substrate. Indeed, each pixel unit 15 in which the fingerprint recognition circuit 16 is built in is a fingerprint collecting point, and may be used to collect the (finger's) concave-convex information corresponding to the fingerprint collecting point, and thus multiple pieces of information collected by a plurality of such a pixel unit 15 may be combined together to obtain the fingerprint information. Therefore, it is not required to dispose the fingerprint recognition circuit 16 in each pixel unit 15, and instead, generally a periodic implanting method is employed to introduce the fingerprint recognition circuits 16 into the display region. As being implemented in practice, one can design a periodic distribution mode, a distribution density or a spacing among the fingerprint recognition circuits 16 based on actual situations, but the present embodiment is not limited thereto.

The specific types of the first transistor M1, the second transistor M2, and the third transistor M3 as described above may have no limitations, as long as these transistors have the corresponding functions, and those skilled in the art can make corresponding change to the circuit connection based on the different types.

However, in an example, in order to avoid extra increasing of the processes due to the fingerprint recognition circuits 16, each of the first transistor M1, the second transistor M2, and the third transistor M3 employs the same tube as the switching tube TFT for controlling the loading of the displaying signal, thus these transistors can be formed synchronously as being manufactured. For example, if the array substrate shown in FIG. 1 is applicable to the liquid crystal display, the first transistor M1, the third transistor M3, and the second transistor M2 in the fingerprint recognition circuits 16 as well as the switching tube TFT in the pixel displaying circuit 19 all employ N-type thin film transistors, and the fingerprint recognition circuits 16 are formed in pixel unit 15 synchronously when the array substrate is being manufactured.

Figure 2:
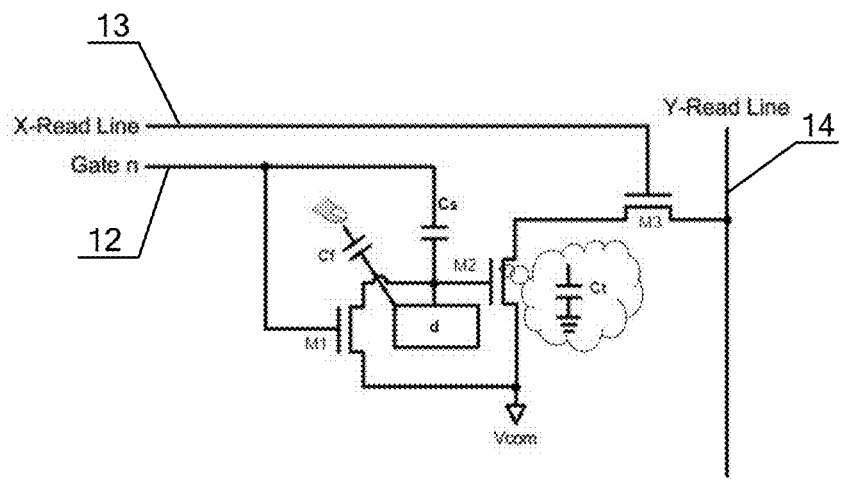
FIG. 2 is an exemplary view illustrating an operating principle of the fingerprint recognition circuit in the first embodiment of the present disclosure.

Hereinafter, an operating process of the fingerprint recognition circuits 16 will be explained in terms of principle with reference to the array substrate shown in FIG. 1. As shown in FIG. 2, when a touching occurs, it is the detecting electrode d who acts as one plate of the capacitor, and the finger acts as the other plate of the capacitor, a coupling capacitance $C_f$ is generated between the detecting electrode d and the finger (then the coupling capacitance $C_f$ carries the concave-convex information on one point of the finger). In addition, the fingerprint recognition circuit 16 further comprises a reference capacitor $C_s$, while the second transistor M2 itself also has a parasitic capacitance $C_t$, and when a finger touches the screen, the coupling capacitance $C_f$ is formed between the detecting electrode d of the current pixel and the concave-convex parts of the finger above the current pixel, thereby a potential (i.e., a potential at the gate) at the control terminal of the second transistor M2 is changed based on different values of $C_f$ (an amplitude of the potential at the gate is decided by a occupation ratio of $C_f$ to $C_s$ and $C_t$, the larger the $C_f$, the smaller the potential of the gate is, and vice versa), so that a current of the drain of the second transistor M2 is changed, thus the concave-convex information is determined.

Figure 3:
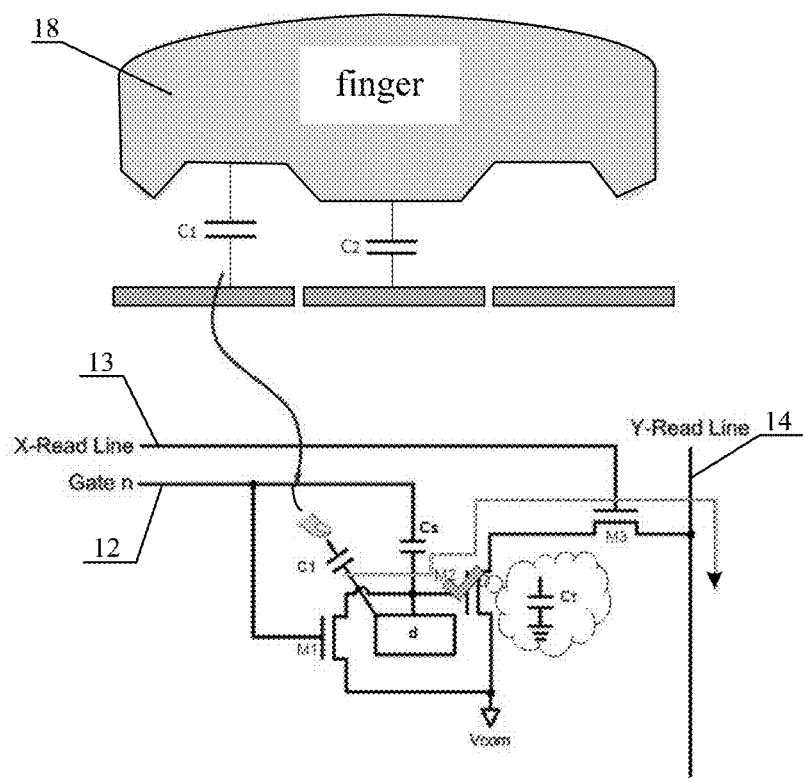
FIG. 3 is an exemplary view illustrating the operating principle of the fingerprint recognition circuit when a fingerprint above a detecting electrode is a concave part in the first embodiment of the present disclosure.

When the third transistor M3 is turned on, the recognition signal generated by the fingerprint recognition unit 162 flows through the third transistor M3, and is transferred to a terminal signal receiving section (located outside of the array substrate) via the signal read line 4 (Y-Read Line), as shown by the dotted arrow in FIG. 3. Specifically, if the finger above the detecting electrode d in the pixel is a concave part, the coupling capacitance formed between the concave part and the detecting electrode d is C1 (which is small), and if C1 is small enough with respect to the reference capacitor Cs and the parasitic capacitance Ct, then at this time the potential at the gate of the second transistor M2 may increase, so that the second transistor M2 is in an amplified and turned on state, the signal read line 4 collects the current signal which has been amplified, thus a result derived by the terminal is that this pixel area corresponds to the concave part of the finger.

Similarly, as shown in FIG. 4, if the finger above the detecting electrode d in the pixel is a convex part, the coupling capacitance formed between the convex part and the detecting electrode d is C2 (which is large), and if C2 is large enough with respect to the reference capacitor Cs and the parasitic capacitance Ct, then at this time the potential at the gate of the second transistor M2 may decrease, so that the second transistor M2 is in a turn-off state, the signal read line 4 collects the initial current signal, thereby the result derived by the terminal is that this pixel area corresponds to the convex part of the finger.

Therefore, the type of the second transistor M2 should be selected so that the second transistor M2 is in the amplified and turned on state when the detecting electrode d corresponds to the concave part of the prints of the finger; while the second transistor M2 is in the turn-off state when the respective detecting electrode d corresponds to the convex part of the prints of the finger, which can be set depending on experiences as being implemented in practice and can be verified with the aid of experiments.

The array substrate according to the present embodiment is applicable to the liquid crystal display, and the pixel unit may have the fingerprint collecting function besides the displaying function. When a display utilizing the array substrate of the present embodiment is used by the user, the fingerprint recognition and the operations can be performed synchronously, and the display device and the fingerprint recognition devices can be manufactured synchronously without being combined in function, which achieves the purpose of simplifying the operations and the manufacturing processes.

The present embodiment further provides a driving method which is applicable for the array substrate as shown in FIG. 1, the method is shown in FIG. 5 and specifically comprises processes as follows.

101: an initialization stage: the initialization unit 161 in the fingerprint recognition circuit 16 initializes the fingerprint recognition unit 162 under the control of initialization signal line (the gate line Gate n in the figure), while the first output control unit 163 turns off the output path under the control of the output control signal line 13 (the X-Read Line in the figure).

In this step, the resetting of the initial signal of the fingerprint recognition circuit 16 is implemented with a gate pulsing signal and a common voltage signal. The initialization signal line (i.e., the gate line Gate n) outputs a high level to turn on the first transistor M1 in the fingerprint recognition circuit 16, and the common voltage signal is inputted to the detecting electrode d, as a result, the potential at the detecting electrode d is reset to the common voltage; meanwhile, the output control signal line 13 (X-Read Line) outputs a low level to turn off the third transistor M3 in the fingerprint recognition circuit 16, and the output path from the fingerprint recognition unit 162 to the signal read line 4 is not turned on. The main purpose of this step is to reset the initial signal of the fingerprint recognition circuit 16.

102: a collection stage: the initialization unit 161 is turned off under the control of the initialization signal line (i.e., the gate line Gate n in the figure), meanwhile the recognition signal generated by the fingerprint recognition unit 162 is outputted to the signal read line 4 under the control of the output control signal line 13.

This step is the fingerprint signal collection stage of the fingerprint recognition circuit 16, the gate line Gate n outputs the low level to turn off the first transistor M1, and to disconnects the common voltage signal input terminal Vcom from the detecting electrode d, the output control signal line 13 (X-Read Line) outputs the high level to turn on the third transistor M3, and the recognition signal generated by the fingerprint recognition unit 162 flows through the third transistor M3 and is transferred to the terminal signal receiving section via the signal read line 4.

Figure 6:
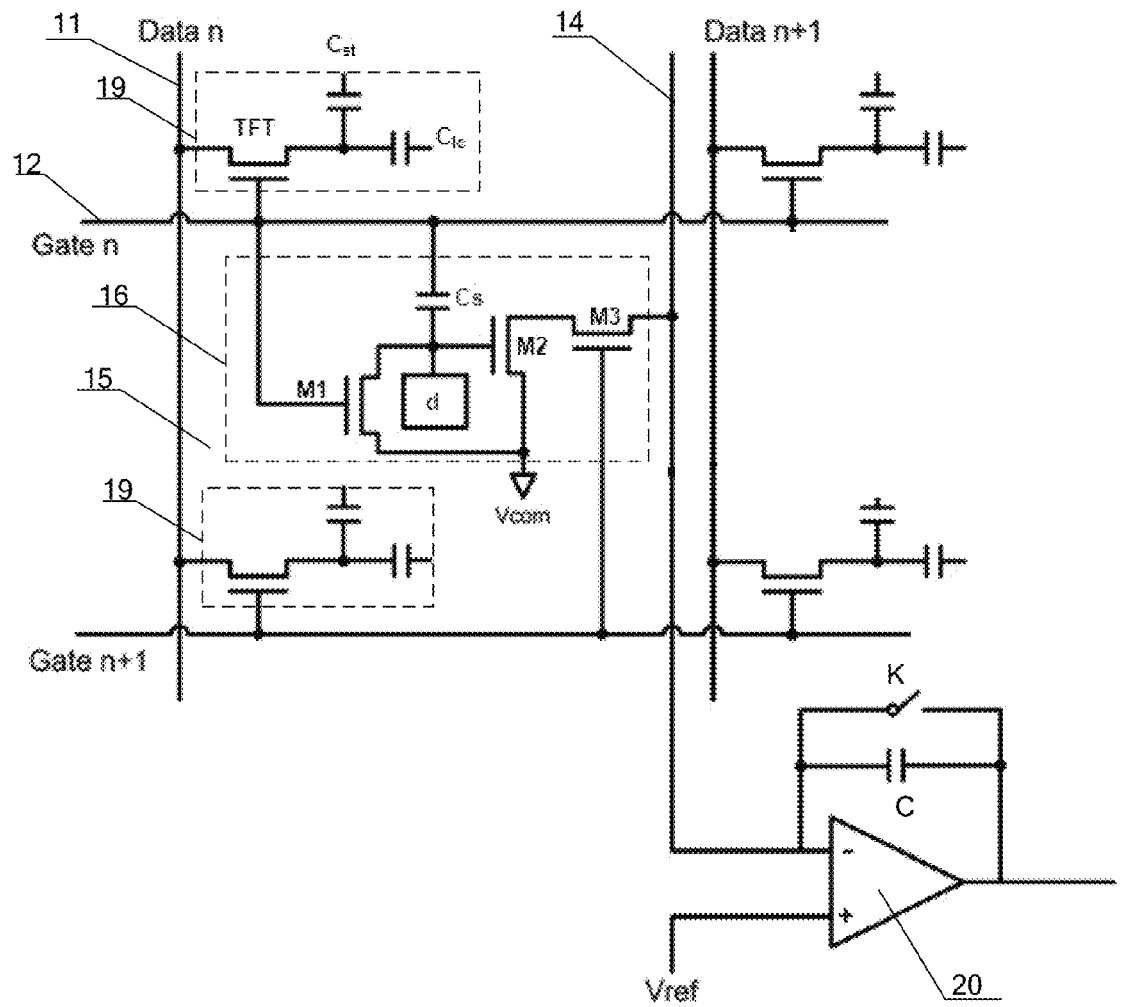
FIG. 6 is an exemplary view illustrating a second structure of the array substrate according to the first embodiment of the present disclosure.

The initialization signal line and the output control signal line 14 may be arranged separately and may also be multiplexed with the gate line. When being arranged separately, the initialization signal line may be arranged to be parallel with the gate line and the signal read line may be arranged to be parallel with the data line. When being multiplexed with the gate line, as shown in FIG. 6, if the nth gate line (Gate n) functions as the initialization signal line in the present embodiment, then the n+1th gate line (n+1) may be selected to function as the output control signal line 13 (X-Read Line) in the present embodiment, that is, the nth gate line is the initialization signal line in the present embodiment, and the n+1th gate line (Gate n+1) is the output control signal line 13 in the present embodiment. Indeed, any one of the gate lines below the nth gate line (Gate n) may also be selected to function as the output control signal line 13, that is, the gate pulsing signal on the output control signal line 13 is required to lag behind the gate pulsing signal on the initialization signal line.

Besides the fingerprint recognition circuit 16, a pixel displaying circuit 19 is further disposed in the pixel as shown in FIG. 1, the pixel displaying circuit 19 specifically comprises a switching tube TFT for controlling the loading of the displaying signal, a liquid crystal deflection capacitor $C_{st}$ and a displaying storage capacitor $C_{1c}$. When the gate line 12 for example the nth gate line (Gate n), outputs a high level, the switching tube TFT is turned on, and the pixel having the fingerprint recognition circuits 16 built in is loaded with a displaying signal, and at the same time this stage also corresponds to the initialization stage of the fingerprint recognition circuits 16 in the pixel unit 15 of the next row; when the gate line of the next row (that is, the n+1th gate line, Gate n+1) with respect to the nth gate line outputs a high level, the switching tube TFT corresponding to the nth row pixel is turned on, the pixel of this row is loaded with a displaying signal, and this stage also corresponds to the collection stage of the fingerprint recognition circuit 16. Wherein, the operating process of the pixel displaying circuit 19 is the same as the prior art, which will not be described in detail in the present embodiment.

An embodiment of the present disclosure provides the array substrate and the driving method thereof in which the fingerprint recognition circuits are arranged within the display region of pixel and are driven with a signal line sharing manner, wherein, the fingerprint of the finger is determined by the signals fed back by the detecting electrodes d of several pixel points, and the position information of each pixel point is determined collectively by the output control signal line 13 (X-Read Line, for determining the X-coordinate along the gate line direction) and the signal read line 4 (Y read line, for determining the Y-coordinate along the data line direction). It should be appreciated that, if one only extracts the position information determined by the output control signal line 13 and the signal read line 4, the touching function can be implemented synchronously without changing the array substrate and the back end hardware; of course, a switching button may also be set (which may be a virtual button) to switch among all of or between any two of the three following modes: the fingerprint recognition, the touching and fingerprint recognition and touching.

When a display device using the array substrate and the driving method thereof of the present embodiment is used by the user, the fingerprint recognition and the operations can be performed synchronously, and the display device and the fingerprint recognition devices can be manufactured synchronously without being combined in function, which achieves the purpose of simplifying the operations and the manufacturing processes.

It should be noted that, although the array substrate provided by an embodiment of the present disclosure is explained by taking a liquid crystal display as an example in FIG. 1, in fact those skilled in the art may appreciate that the application of the present disclosure is not limited thereto, and the technical solutions of the present disclosure are also applied to other types of display such as organic Light Emitting Display (OLED, Organic Light Emitting Diode).

Second Embodiment

An embodiment of the present disclosure further provides another array substrate, which is different from the array substrate in the first embodiment in that, a plurality of light sensation touching circuits 17 for implementing a light sensation touching function are further formed on the base, the light sensation touching circuit 17 is also arranged within the pixel unit 15.

Figure 7:
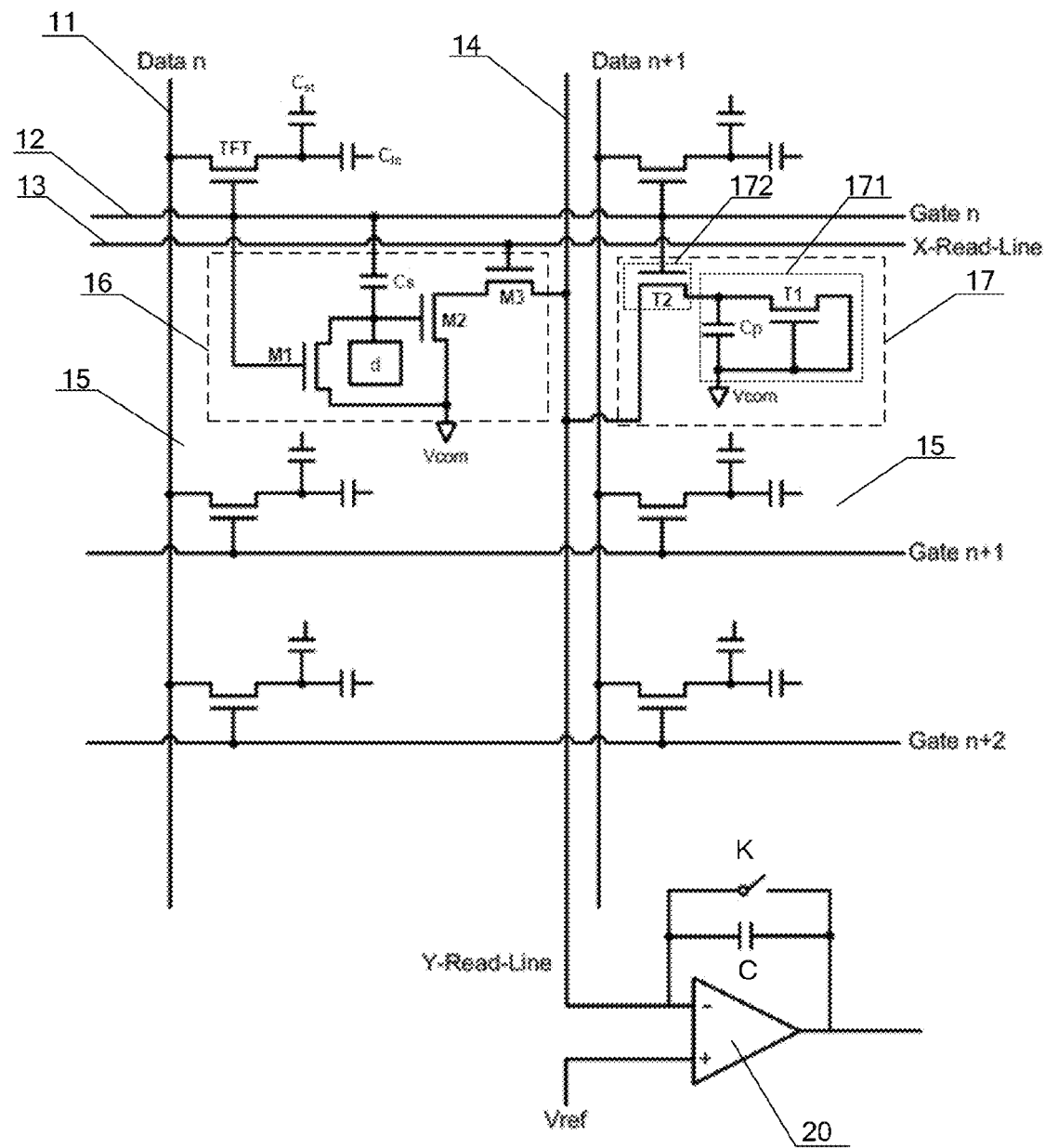
FIG. 7 is an exemplary view illustrating a first structure of the array substrate according to a second embodiment of the present disclosure.

Besides the pixel displaying circuit 19 in each pixel, the array substrate according to the present embodiment further comprises the fingerprint recognition circuits 16 and the light sensation touching circuits 17 which are arranged within the pixel unit 15; a periodic implanting method is employed to introduce both the fingerprint recognition circuits 16 and the light sensation touching circuits 17 into the pixel unit 15, the fingerprint recognition circuits 16 and the light sensation touching circuits 17 may be arranged in the same pixel unit 15, and may also be arranged in different pixel units 15 respectively. For instance, as shown in FIG. 7, the fingerprint recognition circuits 16 and the light sensation touching circuits 17 are arranged with two adjacent pixels respectively. Wherein, as for a liquid crystal display, the pixel displaying circuit 19 as described above specifically comprises: a switching tube TFT for controlling the loading of the displaying signal, as well as a liquid crystal deflection capacitor $C_{st}$ and a displaying storage capacitor $C_{1c}$.

In the array substrate according to the present embodiment, the functions of fingerprint recognition, light sensation touching and displaying are integrated together, the functions of the respective units are implemented through the multiplexing of the gate electrode scanning lines. It should be noted that, the embodiments of the present disclosure have no limitations on the specific implementations of the fingerprint recognition circuits 16, and the light sensation touching circuits 17, which can be any implementations well known to those skilled in the art, only one optional implementation is explained below as a reference.

As shown in FIG. 7, the following are further formed on the base of the array substrate: a data line 11 and a gate line 12 which are arranged as being intersected, a output control signal line 13 (X-Read Line) which is arranged to be parallel with the gate line 12, a signal read line 14 (Y-Read Line) which is arranged to be parallel with the data line 11, and a pixel unit 15 defined by the data line 11 and the gate line 12, the fingerprint recognition circuit 16 is arranged within the pixel unit 15, and the light sensation touching circuits 17 is arranged within another pixel unit 15 adjacent to the aforesaid pixel unit 15, the pixel displaying circuits 19 are further arranged in each of the pixel units 15, the pixel displaying circuit 19 specifically comprises: a switching tube TFT for controlling the loading of the displaying signal as well as a liquid crystal deflection capacitor $C_{st}$ and a displaying storage capacitor $C_{1C}$.

The specific structure and the connection mode of the fingerprint recognition circuit 16 have been described in detail in the first embodiment, therefore only the structure and the connection mode of the light sensation touching circuit 17 will be explained in the following. The light sensation touching circuit 17 specifically comprises: a photosensitive unit 171, connected with the common voltage input terminal Vcom, for collecting optical signals in corresponding areas and converting them into photocurrent signals; the second output control unit 172, connected with an output terminal of the photosensitive unit 171 and connected to the initialization signal line (the gate line Gate n in the figure) and the signal read line 14, for outputting the photocurrent signals generated by the photosensitive unit 171 to the signal read line 14 under the control of the initialization signal line.

In an example, the photosensitive unit comprises a photosensitive tube T1 and a storage capacitor Cp for storing the photocurrent generated by the photosensitive tube, wherein, a first terminal of the photosensitive tube T1 is connected with a control terminal of the photosensitive tube T1 and a first terminal of the storage capacitor Cp, and is connected to the common voltage input terminal Vcom, a second terminal of the photosensitive tube T1 is connected with a second terminal of the storage capacitor Cp, and is connected with the second output control unit 172, as the output terminal of the photosensitive unit 171. The second output control unit 172 comprises a fourth thin film transistor T2, a first terminal of the fourth transistor T2 is connected to the output terminal of the photosensitive unit 171, a second terminal thereof is connected to signal read line 14, and a control terminal thereof is connected to the initialization signal line (gate line Gate n).

The light sensation touching circuit 17 is introduced into the display region in the present embodiment, each of the light sensation touching circuits 17 is configured to comprise the photosensitive tube T1 (for example a light sensation TFT) so as to collect external light signals, a difference value between intensities of the photoelectronic signal before and after the touching is compared with an initial value when no light touching occurs based on variances of the intensity of illumination which the photosensitive tube T1 is subjected to, thus to decide whether a light touching action (that is, the variance in the intensity of illumination) occurs, and finally the signal is collected by the terminal to determine a coordinates of the touch location. When being implemented in particular, a no touching threshold value may be determined by studying the initial value of the intensity of the photoelectronic signal, and then the difference value between the intensities of the photoelectronic signal before and after the touching is compared with the no touching threshold value, if the difference value is less than the no touching threshold value, it is deemed that no light touching occurs, and if the difference value is larger than or equal to the no touching threshold value, it is deemed that the light touching has occurred.

As the light sensation touching circuits 17 is introduced into the display region as described above, generally the periodic implanting method is employed to introduce the light sensation touching circuits 17 into the pixel. As being implemented in practice, each of the pixels in which the light sensation touching circuits 17 is built in corresponds to a light sensation touching point, one can design the periodic distribution mode, the distribution density or the spacing of the light sensation touching circuits 17 based on the actual situations (for example, the design requirement for the light sensation touching point), and the present embodiment is not limited thereto. The light sensation touching structure according to the present embodiment would not be limited by the display size, therefore it is especially suitable for a display apparatus with the large size.

Similarly, it should be noted that, there is no limitations on the specific types of the first transistor M1, the third transistor M3, and the second transistor M2 in the fingerprint recognition circuit 16 as well as the photosensitive tube T1 and the fourth transistor T2 in the light sensation touching circuit 17 in the present embodiment, as long as these transistors have the corresponding functions, and those skilled in the art can make corresponding change to the circuit connection based on the different types.

However, in an example, in order to avoid the extra increasing of processes, each of the first transistor M1, the third transistor M3, and the second transistor M2 in the fingerprint recognition circuits 16, as well as the photosensitive tube T1 and fourth transistor T2 in the light sensation touching circuit 17 employs the same tube as the switching tube TFT for controlling the loading of the displaying signal, thus these transistors can be formed synchronously when being manufactured.

The array substrate shown in the FIG. 7 is applicable for the liquid crystal display, and the first transistor M1, the third transistor M3, and the second transistor M2 in the fingerprint recognition circuit 16, the photosensitive tube T1 and the fourth transistor T2 in the light sensation touching circuit 17 as well as the switching tube in the pixel displaying circuit 19 all employ the N-type thin film transistors, in this way, the fingerprint recognition circuits 16 and the light sensation touching circuits 17 are formed in pixel unit synchronously while the array substrate is being manufactured. As being manufactured in practice, the N-type thin film transistors as described above may be formed with a Low Temperature Poly-silicon (LTPS) technology.

With the array substrate according to the present embodiment, no extra processes are added when the liquid crystal display is produced, that is, the fingerprint recognition function and the light sensation touching function may be introduced into the display screen, thereby reducing the manufacturing cost greatly, while the liquid crystal display can have the functions of displaying, fingerprint recognition, and light sensation touching, and its operation is convenient and of high efficiency. In addition, the present embodiment uses the multiplexing of the gate line and the signal read line to implement the addition of the fingerprint recognition function, light sensation touching function and the displaying function, which makes a revolution on the combing manner of the devices with separate functions and the display device in function, thus the additional value of the product is increased.

The present embodiment further provides a driving method of an array substrate, the method will be explained hereinafter in detail with reference to the structure shown in FIG. 7 and the driving signal shown in FIG. 8, the method specifically comprises processes as follows.

A first stage (1th Stage): as for the fingerprint recognition circuit 16, the initialization unit 161 initializes the fingerprint recognition unit 162 under the control of initialization signal line (the gate line Gate n in the figure), while the first output control unit 163 turns off the output path under the control of the output control signal line 13 (the X-Read Line in the figure); as for the light sensation touching circuit 17, the second output control unit 172 turns on the output path from the photosensitive unit 171 to the signal read line 14 under the control of the initialization signal line, and the photocurrent signal generated by the photosensitive unit 171 which is due to the illumination is outputted via the signal read line 14, the difference value of the intensities of the outputted photocurrent signal is compared with the no touching threshold value, and then it is decided whether a light touching action occurs in the first stage based on the comparison result and the position of the light touching action is determined.

A second stage: as for the fingerprint recognition circuit 16, the initialization unit 161 is turned off, meanwhile, the recognition signal generated by the fingerprint recognition unit 162 is outputted to the signal read line 14 under the control of the output control signal line 13; as for the light sensation touching circuit 17, the second output control unit 172 turns off the output path from the photosensitive unit 171 to the signal read line 14.

Figure 8:
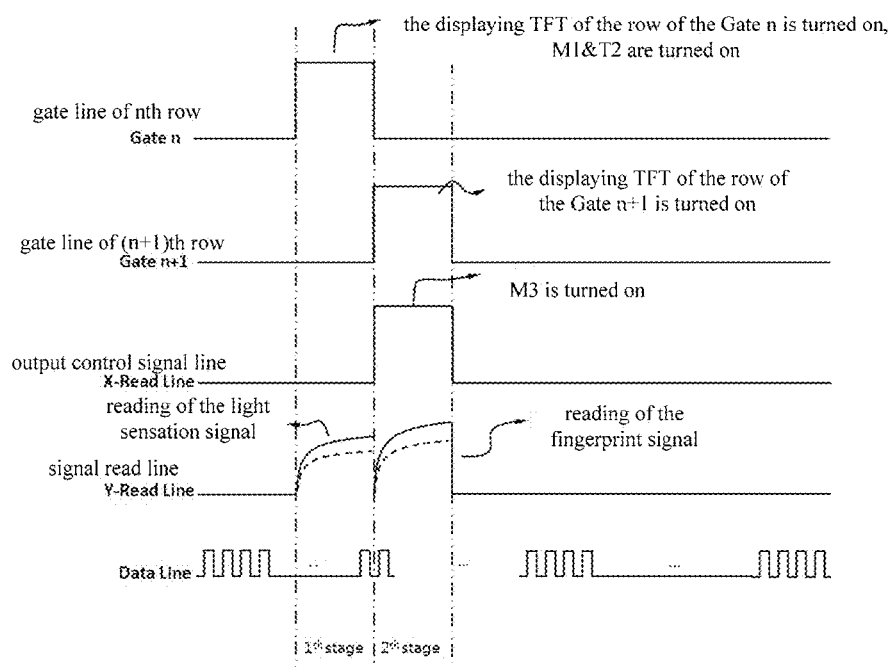
FIG. 8 is an operating timing diagram of the array substrate shown in FIG. 7.

As can be seen from FIG. 8, in the first stage, the signal on the nth gate line becomes is in the high level, so that all the TFTs controlled by this gate line are turned on and meanwhile the first transistor M1 in the fingerprint recognition circuit 16 at this position is also turned on, an initial reset signal is provided by the common voltage signal Vcom and inputted to the detecting electrode d, and then the potential at the detecting electrode d becomes the common voltage. A major purpose of the process is to reset the initial signal of the fingerprint recognition circuit 16.

As for the light sensation touching circuit 17, in the first stage, the high level on the nth gate line (Gate n) also turns on the fourth transistor T2 in the light sensation touching circuit 17, at this point, in a case that a potential difference stored in the storage capacitor Cp is a fixed value, when the light is irradiated to the light sensation touching circuit 17, the intensity of illumination received by the photosensitive tube (photo Sensor) T1 increases, and the photoelectric current also increases; at this point, since the fourth transistor T2 remains to be turned on, this signal (the photocurrent of the photosensitive tube T1 at this point) is transmitted to an end amplifier 20 via the signal read line 14 (Y-Read Line), and then the signal amplified by the amplifier 20 is transmitted to the processor (not shown in the finger) in turn to be subject to data computational analysis; thus, if a touching action occurs in the second stage, as long as the difference value of intensities of the photoelectronic signal before and after the touching is compared with the no touching threshold value, it can decide whether a light touching occurs and determine the position of the light touching. Wherein, as for the position of the light touching, its coordinate in the X-direction (being parallel with the gate line) is determined by the nth gate line (Gate n) output point at this point, and its coordinate in the Y-direction (being parallel with the data line) is determined by the signal read line 14 (Y-Read Line).

As can be seen from FIG. 8, in the second stage, both the n+1th gate line (Gate n+1) and the control signal line 13 (X-Read Line) are in the high level, the displaying TFT of the n+1th row are turned on; in addition, the control signal line 13 also functions as the read line in the X direction of the fingerprint recognition circuit 16 (being parallel with the direction of the gate line), and is used for turning on the third transistor M3, and at this point, the signal read line 14 (Y Read Line) can collect information for the second time; and at this point the collected information corresponds to the fingerprint data, and is recognized and converted by the operational amplifier of the terminal, to finally obtain the desired fingerprint information. At this point, since the nth gate line (Gate n) has become the low level, the output path of the light sensation touching circuit 17 in which the fourth transistor T2 is arranged is in an OFF state.

In conclusion, the signal read line 14 performs the signal recognition via the signal read line 14 twice in the first and the second stage, and collects the light sensation touching signal and the fingerprint signal respectively, so that the number of the signal lines may be reduced greatly, meanwhile the gate line 12 and the signal read line 14 are used effectively, and the integration of the three functions of displaying, fingerprint recognition, and light touching is implemented with a multiplexing method.

Figure 9:
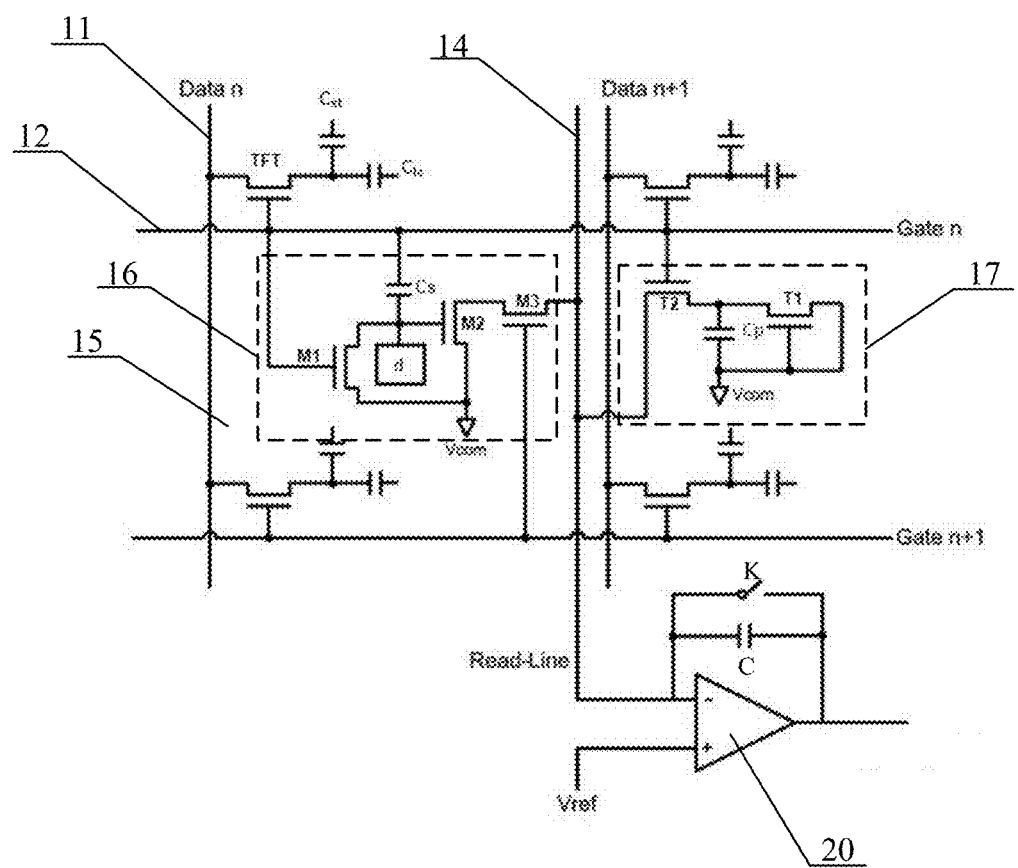
FIG. 9 is an exemplary view illustrating a second structure of the array substrate according to the second embodiment of the present disclosure.
Figure 10:
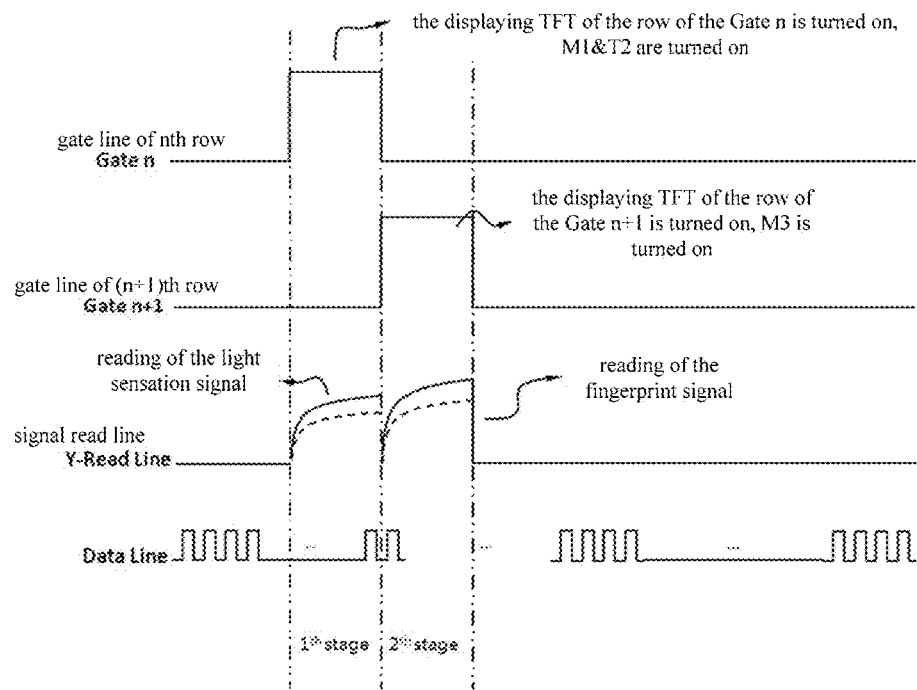
FIG. 10 is an operating timing diagram of the array substrate shown in FIG. 9.

Similarly, the initialization signal line and the output control signal line 14 as described above may be arranged separately and may also be multiplexed with the gate line. However, in an example, as shown in FIG. 9, if the nth gate line (Gate n) functions as the initialization signal line in the present embodiment, then the n+1th gate line (Gate n+1) may be selected to function as the output control signal line 13 (X read line) in the present embodiment, that is, the nth gate line is the initialization signal line in the present embodiment, and the n+1th gate line (Gate n+1) is the output control signal line 13 in the present embodiment, the specific operating principle thereof is the same as that of the above embodiments. FIG. 10 is the operating timing diagram of the array substrate as shown in FIG. 9.

The array substrate and the driving method thereof according to the present embodiment may combine the signals of the pixel displaying circuit, the fingerprint recognition, and the light sensation touching together on the premise of normal displaying, thereby implementing an efficient integration of the three functions. When a display device using the array substrate and the driving method thereof of the present embodiment is used by the user, the fingerprint recognition and operations can be performed synchronously while the light sensation touching function can be implemented; and the display device, the fingerprint recognition devices and the light sensation touching devices can be manufactured synchronously without being combined in function, which achieves the purpose of simplifying the operations and the manufacturing processes.

Third Embodiment

An embodiment of the present disclosure further provides a display apparatus which comprises the array substrate as described in the first embodiment or the second embodiment.

In the array substrate in the first embodiment or the second embodiment, the fingerprint recognition function (or the fingerprint recognition function along with the light sensation touching function) is introduced into the display region; with a display panel using such an array substrate, the displaying function and the fingerprint recognition function (or the fingerprint recognition and the light sensation touching function) can be implemented simultaneously. When a display apparatus using the array substrate as described above is used by the user, the fingerprint recognition and the operations can be performed synchronously, and the display device and the fingerprint recognition devices can be manufactured synchronously without being combined in function, which achieves the purpose of simplifying the operations and the manufacturing processes.

The display apparatus may be any products or components having the function of displaying such as a liquid crystal panel, an electronic paper, an OLED panel, a handset, a tablet computer, a TV set, a display, a notebook computer, a digital frame, and a navigator etc.

Further, as shown in FIG. 1, the fingerprint recognition circuit 16 in the array substrate is also connected to an amplifier 20; a first input terminal of the amplifier 20 is connected to the terminal of the signal read line 14 in the fingerprint recognition circuit 16, a second input terminal of the amplifier 20 is inputted with a reference voltage Vref, and a capacitor C and a switch K are connected in parallel between the first input terminal and the output terminal of the amplifier 20.

If the same signal read line 14 is connected to the fingerprint recognition circuit 16 and the light sensation touching circuit 17 at the same time, in the first stage, the signal read line 14 collects the light touching information, the reference voltage Vref of the amplifier 20 is the no touching threshold value as no light sensation touching occurs; in the second stage, the signal read line 14 collects the fingerprint information, the reference voltage Vref of the amplifier 20 is a threshold value as no touch action occurs.

The present embodiment provides an array substrate integrating the fingerprint recognition and the light sensation touching, when a pixel matrix having the displaying function is formed, meanwhile the fingerprint recognition circuits and the light sensation touching circuits are implanted into the pixel unit periodically, so as to implement the integration of the three functions of the displaying, the fingerprint recognition and in cell light sensation touching.

In order to facilitate the clear explanation, in the present disclosure, words such as first, second are used to distinguish the similar items by category, the words such as first, second do not limit the present disclosure in terms of number, rather it is only illustrations of one preferred implementation, and the obvious similar variance or relevant extension which could occur to those skilled in the art based on the content disclosed by the present disclosure all belong to the scope of the present disclosure.

Various embodiments in the specification are all described by a step by step method, the similar parts among various embodiments can be referred to each other, and as for any one of the embodiments, the focus is to explain the difference as compared with other embodiments. Especially, the process embodiment is described relatively simper, and the relevant parts can be referred to the explanation of the corresponding parts of the apparatus embodiment.

One have ordinary skill in the art may appreciate that the implementation of the all or part of the process in the methods of the embodiments as described above can be finished by the computer programs by instructing the relevant hardware, the programs may be stored in a computer readable storage medium, when being executed, can comprise the process of the embodiments of the methods as mentioned above. Wherein, the storage medium may be a diskette, an optical disk, a Read-Only Memory (ROM) or a Random Access Memory (RAM) etc.

The above descriptions only illustrate the specific embodiments of the present invention, and the protection scope of the present invention is not limited to this. Given the teaching as disclosed herein, variations or substitutions, which can easily occur to any skilled pertaining to the art, should be covered by the protection scope of the present invention. Thus, the protection scope of the present invention is defined by the claims.

What is claimed is:

1. An array substrate, comprising a base on which gate lines, data lines, pixel circuits defined by the gate lines and the data lines, and a plurality of fingerprint recognition circuits for performing a fingerprint recognition are formed,
   wherein each of the fingerprint recognition circuits is arranged within a pixel circuit and comprises a fingerprint recognition sub-circuit for recognizing a fingerprint in a corresponding area and generating a recognition signal,
   wherein the fingerprint recognition sub-circuit comprises a sensing electrode, a reference capacitor and a first transistor,
   wherein the reference capacitor has a first terminal as a voltage input terminal of the fingerprint recognition sub-circuit and connected to both the sensing electrode and a control terminal of the first transistor, and a second terminal connected to an initialization signal line, and
   wherein the first transistor further has a first terminal connected to a common voltage input terminal and a second terminal as an output terminal of the fingerprint recognition sub-circuit.

2. The array substrate as claimed in claim 1, wherein each of the fingerprint recognition circuits further comprises an initialization sub-circuit for initializing the fingerprint recognition circuit under control of a signal from the initialization signal line,
   wherein the initialization sub-circuit comprises a second transistor, and
   wherein the second transistor has a first terminal connected to the common voltage input terminal, a second terminal connected to the voltage input terminal of the fingerprint recognition sub-circuit, and a control terminal connected to the initialization signal line.

3. The array substrate as claimed in claim 1, wherein each of the fingerprint recognition circuits further comprises a first output control sub-circuit for outputting the recognition signal generated by the fingerprint recognition sub-circuit to a signal read line under control of a signal from an output control signal line,
   wherein the first output control sub-circuit comprises a third transistor, and
   wherein the third transistor has a first terminal connected to the output terminal of the fingerprint recognition sub-circuit, a second terminal connected to a signal read line, and a control terminal connected to an output control signal line.

4. The array substrate as claimed in claim 1, wherein a plurality of light sensation touching circuits for implementing a light sensation touching function are further formed on the base,
   wherein each of the light sensation touching circuits is arranged within the pixel circuit and comprises a photosensitive sub-circuit for collecting an optical signal in the corresponding area and converting the collected optical signal into a photocurrent signal,
   wherein the photosensitive sub-circuit comprises a photosensitive tube and a storage capacitor, and
   wherein a first terminal of the photosensitive tube is connected with a control terminal of the photosensitive tube and a first terminal of the storage capacitor, and is connected to the common voltage input terminal, a second terminal of the photosensitive tube is connected with a second terminal of the storage capacitor as an output terminal of the photosensitive sub-circuit.

5. The array substrate as claimed in claim 4, wherein each of the light sensation touching circuits further comprises a second output control sub-circuit for outputting the photocurrent signal generated by the photosensitive sub-circuit to a signal read line under control of a signal from the initialization signal line,
   wherein second output control sub-circuit comprises a fourth thin film transistor, and
   wherein the fourth thin film transistor has a first terminal connected to the output terminal of the photosensitive sub-circuit, a second terminal connected to the signal read line, and a control terminal connected to the initialization signal line.

6. The array substrate as claimed in claim 5, wherein the initialization signal line is arranged to be parallel with the gate line, and the signal read line is arranged to be parallel with the data line.

7. The array substrate as claimed in claim 3, wherein the initialization signal line is a gate line, and the output control signal line is a gate line of a next row with respect to the initialization signal line.

8. A display apparatus, comprising an array substrate as claimed in claim 1.

9. The display apparatus as claimed in claim 8, wherein the fingerprint recognition circuit is further connected to an amplifier; and
   a first input terminal of the amplifier is connected to an end of a signal read line in the fingerprint recognition circuit, a second input terminal of the amplifier is inputted with a reference voltage, and a capacitor and a switch are connected in parallel between the first input terminal and an output terminal of the amplifier.

10. The display apparatus as claimed in claim 8, wherein each of the fingerprint recognition circuits further comprises an initialization sub-circuit for initializing the fingerprint recognition circuit under control of a signal from the initialization signal line,
    wherein the initialization sub-circuit comprises a second transistor, and
    wherein the second transistor has a first terminal connected to the common voltage input terminal, a second terminal connected to the voltage input terminal of the fingerprint recognition sub-circuit, and a control terminal connected to the initialization signal line.

11. The display apparatus as claimed in claim 8, wherein each of the fingerprint recognition circuits further comprises a first output control sub-circuit for outputting the recognition signal generated by the fingerprint recognition sub-circuit to a signal read line under control of a signal from an output control signal line,
    wherein the first output control sub-circuit comprises a third transistor, and
    wherein the third transistor has a first terminal connected to the output terminal of the fingerprint recognition sub-circuit, a second terminal connected to a signal read line, and a control terminal connected to an output control signal line.

12. The display apparatus as claimed in claim 8, wherein a plurality of light sensation touching circuits for implementing a light sensation touching function are further formed on the base,
    wherein each of the light sensation touching circuits is arranged within the pixel circuit and comprises a photosensitive sub-circuit for collecting an optical signal in the corresponding area and converting the collected optical signal into a photocurrent signal,
    wherein the photosensitive sub-circuit comprises a photosensitive tube and a storage capacitor, and
    wherein a first terminal of the photosensitive tube is connected with a control terminal of the photosensitive tube and a first terminal of the storage capacitor, and is connected to the common voltage input terminal, a second terminal of the photosensitive tube is connected with a second terminal of the storage capacitor as an output terminal of the photosensitive sub-circuit.

13. A driving method of an array substrate as claimed in claim 1, comprising:
    an initialization stage, wherein the fingerprint recognition sub-circuit is initialized under control of a signal from the initialization signal line, while an output path is turned off under control of a signal from an output control signal line, and
    a collection stage, wherein the recognition signal generated by the fingerprint recognition sub-circuit is outputted to a signal read line under control of a signal from an output control signal line.

14. The display apparatus as claimed in claim 12, wherein each of the light sensation touching circuits further comprises a second output control sub-circuit for outputting the photocurrent signal generated by the photosensitive sub-circuit to a signal read line under control of a signal from the initialization signal line,
    wherein second output control sub-circuit comprises a fourth thin film transistor, and
    wherein the fourth thin film transistor has a first terminal connected to the output terminal of the photosensitive sub-circuit, a second terminal connected to the signal read line, and a control terminal connected to the initialization signal line.

15. The driving method as claimed in claim 13, wherein a plurality of light sensation touching circuits for implementing a light sensation touching function are further formed on the base,
    wherein each of the light sensation touching circuits is arranged within the pixel circuit and comprises a photosensitive sub-circuit for collecting an optical signal in the corresponding area and converting the collected optical signal into a photocurrent signal,
    wherein the photosensitive sub-circuit comprises a photosensitive tube and a storage capacitor, and
    wherein a first terminal of the photosensitive tube is connected with a control terminal of the photosensitive tube and a first terminal of the storage capacitor, and is connected to the common voltage input terminal, a second terminal of the photosensitive tube is connected with a second terminal of the storage capacitor as an output terminal of the photosensitive sub-circuit.

16. The driving method as claimed in claim 15, wherein:

during the initialization stage, an output path from the photosensitive sub-circuit to the signal read line under control of a signal from the initialization signal line is turned on, a photocurrent signal generated by the photosensitive sub-circuit which is due to an illumination is outputted via the signal read line, a difference value of intensities of the photocurrent signal is compared with a no touching threshold value, and then it is decided whether a light touching action occurs in the initialization stage based on a comparison result and then a position of the light touching action is determined, and during the collection stage, the output path from the photosensitive sub-circuit to the signal read line is turned off.

\* \* \* \* \*